US011468101B2

(12) United States Patent
Tinsley et al.

(10) Patent No.: US 11,468,101 B2
(45) Date of Patent: Oct. 11, 2022

(54) CONTEXT-RICH KEY FRAMEWORK IMPLEMENTATIONS FOR GLOBAL CONCEPT MANAGEMENT

(71) Applicant: Kuni Ahi LLC, La Honda, CA (US)

(72) Inventors: David Tinsley, La Honda, CA (US); Frank Busalacchi, La Honda, CA (US); David Kerley, La Honda, CA (US)

(73) Assignee: Kuni Ahi LLC, La Honda, CA (US)

(*) Notice: Subject to any disclaimer, the term of this patent is extended or adjusted under 35 U.S.C. 154(b) by 378 days.

(21) Appl. No.: 14/725,215

(22) Filed: May 29, 2015

(65) Prior Publication Data

US 2016/0350399 A1    Dec. 1, 2016

(51) Int. Cl.
| | |
|---|---|
| *H04L 67/63* | (2022.01) |
| *G06F 16/28* | (2019.01) |
| *G06F 8/70* | (2018.01) |
| *H04L 67/10* | (2022.01) |
| *G06F 8/656* | (2018.01) |
| *H04L 67/00* | (2022.01) |
| *H04L 41/0806* | (2022.01) |

(52) U.S. Cl.
CPC .............. *G06F 16/288* (2019.01); *G06F 8/70* (2013.01); *H04L 67/10* (2013.01); *H04L 67/63* (2022.05); *G06F 8/656* (2018.02); *H04L 41/0806* (2013.01); *H04L 67/34* (2013.01)

(58) Field of Classification Search
USPC ....................................................... 707/736
See application file for complete search history.

(56) References Cited

U.S. PATENT DOCUMENTS 5,822,743 A     10/1998   Gupta et al.
6,487,641 B1 *   11/2002   Cusson ............... G06F 16/9574
                                                                                                         707/E17.12

(Continued)

OTHER PUBLICATIONS

Final Office Action for U.S. Appl. No. 15/486,291, dated Jan. 26, 2022, 41 pages.

*Primary Examiner* — Tamara T Kyle
*Assistant Examiner* — Raheem Hoffler
(74) *Attorney, Agent, or Firm* — Compass IP Law PC

(57) ABSTRACT

Various implementations provide a Context-Rich Key ("CRK") Framework for managing computing, networking, concepts, and context from human and system-of-systems perspectives. The CRK Framework provides an environment for defining and implementing interoperability models for collections of distributed applications and/or systems within a digital culture, and for managing concepts between digital cultures. In some implementations, a digital processing system receives a global request, e.g. for information related to a target concept. In some implementations, if the digital processing system has access to data relevant to the target concept, the digital processing system identifies an appropriate local object. In some implementations, the digital processing system then processes the global request to generate and initiate or run a local action. Upon initiation of the local action, local action results are generated. In some implementations, the digital processing system processes the local action results, returns the local action results to the requesting system, or both.

20 Claims, 10 Drawing Sheets

(56) References Cited

U.S. PATENT DOCUMENTS

| | | | |
|---|---|---|---|
| 7,162,528 B1* | 1/2007 | Simonoff | H04L 12/1822 709/229 |
| 7,526,481 B1* | 4/2009 | Cusson | G06F 16/9574 |
| 8,752,057 B1* | 6/2014 | Gould | G06F 9/526 718/102 |
| 8,769,480 B1* | 7/2014 | Wagner | G06Q 30/0201 707/999.205 |
| 9,002,900 B2* | 4/2015 | Feinsmith | G06Q 10/10 707/802 |
| 9,137,102 B1* | 9/2015 | Miller | H04L 41/0803 |
| 9,332,024 B1 | 5/2016 | Gulko | |
| 9,553,951 B1 | 1/2017 | Nguyen et al. | |
| 10,325,212 B1* | 6/2019 | Paliwal | G06N 3/006 |
| 10,681,060 B2 | 6/2020 | Scheidler et al. | |
| 2003/0101054 A1* | 5/2003 | Davis | G10L 15/26 704/235 |
| 2003/0208575 A1 | 11/2003 | Cox et al. | |
| 2005/0044187 A1* | 2/2005 | Jhaveri | H04L 67/30 707/E17.032 |
| 2005/0050054 A1* | 3/2005 | Clark | H04L 67/30 |
| 2007/0121999 A1 | 5/2007 | Ma et al. | |
| 2007/0179971 A1* | 8/2007 | Benson | G06F 17/30592 |
| 2007/0239604 A1 | 10/2007 | O'Connell et al. | |
| 2007/0244987 A1* | 10/2007 | Pedersen | H04L 67/2842 709/217 |
| 2008/0195617 A1* | 8/2008 | Holt | G06F 9/526 |
| 2008/0288516 A1* | 11/2008 | Hadfield | G06F 16/3335 |
| 2009/0019318 A1 | 1/2009 | Cochrane et al. | |
| 2009/0210373 A1 | 8/2009 | Yu et al. | |
| 2009/0276771 A1 | 11/2009 | Nickolov et al. | |
| 2010/0049766 A1 | 2/2010 | Sweeney et al. | |
| 2011/0161944 A1* | 6/2011 | Cho | G06F 8/456 717/149 |
| 2012/0110055 A1* | 5/2012 | Van Biljon | G06Q 30/04 709/201 |
| 2012/0289147 A1* | 11/2012 | Raleigh | H04L 67/2847 455/3.06 |
| 2013/0006968 A1* | 1/2013 | Gusmini | G06F 16/25 707/722 |
| 2013/0031076 A1* | 1/2013 | Bhola | G06F 17/3066 707/706 |
| 2013/0275429 A1* | 10/2013 | York | G06F 17/30029 707/737 |
| 2013/0290518 A1 | 10/2013 | Busalacchi et al. | |
| 2014/0304718 A1* | 10/2014 | Gambardella | H04L 67/34 719/328 |
| 2014/0344391 A1* | 11/2014 | Varney | H04L 41/0803 709/213 |
| 2015/0243179 A1 | 8/2015 | Zaslavsky et al. | |
| 2015/0378802 A1 | 12/2015 | Hofig | |
| 2016/0350531 A1 | 12/2016 | Harris et al. | |
| 2017/0061322 A1 | 3/2017 | Chari et al. | |
| 2018/0248895 A1 | 8/2018 | Watson et al. | |

* cited by examiner

XTYPE SPECIFICATION (SignatureLogs)

| XType | SignatureLogs (Web site access log X-Type) | | | | | |
|---|---|---|---|---|---|---|
| Source | ApacheLog Reference to ApacheLog Table | | | | | |

| Element | Data Type | Element Type | Element | | | |
| | | | Column | Vector | Reference Element | Formatter | Description |
|---|---|---|---|---|---|---|---|
| IpAddress | String | Persistent Element | Ip_Address | | | | Web site accessors address |
| IpPort | Numeric | Persistent Element | Ip_Port | | | | Web site accessors port number |
| AccessTime | DateTime | Persistent Element | Timestamp | | | | Time of Web site access |
| Signature | String | Persistent Element | Request | | | | Request made by Accessor |
| Result | String | Persistent Element | Result | | | | Result of request |
| SignatureLogs | Content | Vector Element | | SignatureLogs | | | X-Type "Self-VectorElement" |
| Protocol | String | Composite Element | | SignatureLogs | Signature | Protocol Formatter | Protocol as derived from Signature |
| ProtocolType | String | Reference Element | | ProtocolTypes | ProtocolType | | The protocol type derived from Protocol |

FIG. 6

XTYPE SPECIFICATION (ProtocolType)

| XType | ProtocolType |  |  |  |  |
|---|---|---|---|---|---|
|  | (Protocol type X-Type) |  |  |  |  |
| Source | ProtocolType |  |  |  |  |
|  | Reference to ProtocolType Table |  |  |  |  |
|  |  | Element |  |  |  |
| Element | Data Type | Element Type | Column | Vector | Reference Element | Formatter | Description |
| Protocol | String | Persistent Element | Protocol |  |  |  | Protocol Signature |
| ProtocolType | String | Persistent Element | Protocol Type |  |  |  | Protocol Type description |
| ProtocolTypes | Content | Vector Element |  | ProtocolTypes |  |  | X-Type "Self-VectorElement" |

FIG. 7

EXAMPLE VECTOR SPECIFICATIONS

| Vector | | | Vector Reference | | | | | |
|---|---|---|---|---|---|---|---|---|
| Vector (Name) | Target XType | Vector Type | Field | Element | Operation | Value | FromElement | Description |
| SignatureLogs | SignatureLogs | Proximity | 10 | IpAddress | | | | Primary SignatureLogs vector |
| | | | 20 | IpPort | | | | |
| | | | 30 | AccessTime | | | | |
| ProtocolTypes | ProtocolTypes | Proximity | 10 | Protocol | | | | Primary ProtocolTypes Vector |

FIG. 8

CONTEXT-RICH KEY FRAMEWORK IMPLEMENTATIONS FOR GLOBAL CONCEPT MANAGEMENT

BACKGROUND

Existing electronic information management systems, including databases and other systems, typically automate desired behavior by forcing machine-resident, data-centric computerized expressions ("Computer Artifacts") of real-life concepts and things to digitally interact through hardware and/or predefined software-based instructions. These interactions are typically captured as additional Computer Artifacts, which can be passed to another application that forwards them to other computers, servers, or systems.

This application extends the concepts described in U.S. Pat. Nos. 7,647,337, 7,783,766, 8,290,988, 8,706,774, and U.S. Patent Application Pub. No. 2011/0035477 related to Global Information Architecture, Global Information Network Architecture, Network Clustering Technology, Vector-Relational Data Modeling, WorldSpace architecture, X-Types and other objects, and other concepts taught in the documents listed in this paragraph, each of which is incorporated herein in its entirety.

Various implementations provided herein involve a Context-Rich Key ("CRK") Framework for managing computing, networking, concepts, and context from human and system-of-systems perspectives. The CRK Framework provides an environment for defining and implementing interoperability models for collections of distributed applications and/or systems within a "digital culture", i.e., a domain of commonality among a group of users, and for managing concepts among digital cultures.

Existing systems typically automate desired electronic behavior using predefined, machine-resident and data-centric computerized expressions ("Computer Artifacts") of real things which digitally interact through hardware or software-based instructions. The results of those interactions are then typically captured as additional Computer Artifacts. For example, consider a consumer credit card purchase: a cash register records the sale, while a credit card validation machine obtains electronic approval, creating at least two different digital transactions represented by two or more Computer Artifacts. In current multi-computer "Information Clouds" those Computer Artifacts are typically passed to another application that forwards them to other computers. In our example, a credit card company acting as the clearinghouse for credit card transactions, creates new Computer Artifacts and sends them to the banks that actually handle the payment transactions. Then, in another round of computer-specific programming and processing, the clearinghouse Computer Artifacts are translated into new bank-specific Computer Artifacts in order to process and produce merchant statements and consumer credit card bills.

These existing systems suffer from several flaws. First, each Computer Artifact is a local computer-centric token that generally requires additional context or programming to properly represent it in a human-understandable or real-world form. Further, these digital interactions are defined locally in coded instructions, which are often platform- or even computer-specific. In this context, communicating equivalence and meaning between systems or digital cultures requires a substantial amount of human intervention in the form of platform-specific coding, or manual data routing, etc. These factors can limit interoperability, scalability, and extensibility of systems and information.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 6 is a chart showing an example XType specification of type SignatureLogs.

FIG. 7 is a chart showing an example XType specification of type ProtocolType.

FIG. 8 is a chart showing example vector specifications.

DETAILED DESCRIPTION

Figure 1:
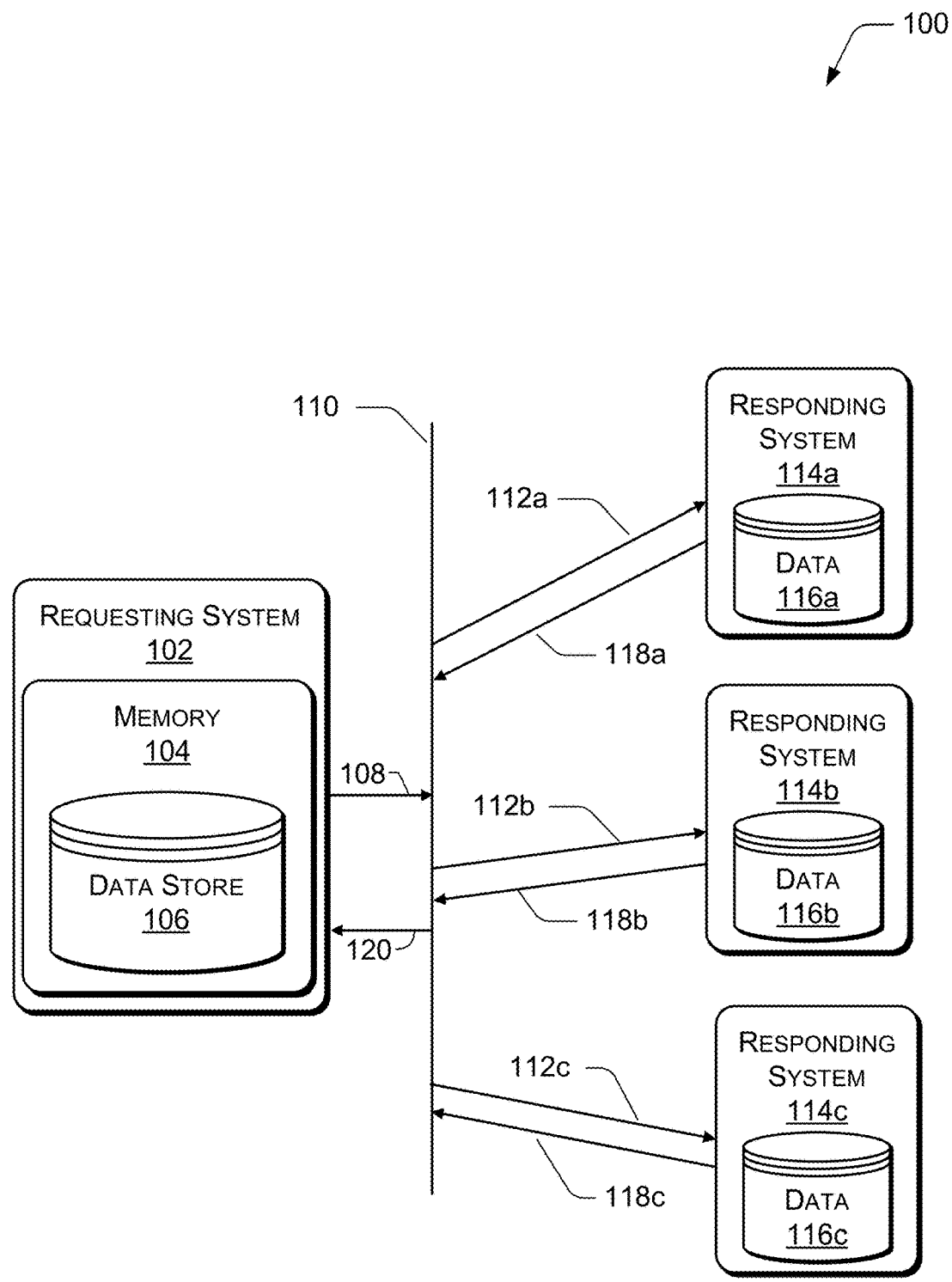
FIG. 1 is a block diagram of several example systems responding to a request by a requesting system, according to some implementations of the present invention.

Described herein are processes and systems for managing computing, networking, concepts, context, and traditional data from human and system-of-systems perspectives. In some implementations, a Context-Rich Key ("CRK") Framework defines environments and objects for managing interoperability models for collections of distributed applications or systems within a digital culture, as well as for managing global concepts and information.

Methods and systems disclosed herein provide a framework for enabling interoperability among existing information systems, digital cultures, global and local concepts, human actors, events, data models, etc. One aspect of the proposed CRK Framework provides the ability for system designers or electronic modules to create digital concept managers (also "digital membranes") that can encapsulate the capabilities, functionality, services, and systems that make up our digital universe. These membranes enable various global systems, including human and computer systems to interact with today's computers, software, digital machines, and networks in a way that resembles and models human conceptual understandings of real things, events, and actions that make up the digital world. These digital membranes can include information model constructs that face outward to provide natural interfaces using user-relevant expressions of real-world concepts, and then face inward to enable model constructs interpret those expressions as relevant orchestrations of the underlying computational systems, applications, and networks that power our modern world as required to implement the intent of the real-world concept interactions those expressions are intended to identify. The CRK Framework enables the rapid and obvious development of these information model constructs with which humans interact, and, in turn, interact with the relevant computational systems, or other humans, when the application is human social interaction. These models use rigorous semantic definitions to represent the nature and culture of the targeted users, which are in then translated to the operational requirements of dependent systems, providing a unique approach to system design and interoperability.

Described herein are new ways of managing "Conceptual Objects," examples of which are concepts, users, actions, events, things, artifacts, etc. Conceptual Objects within the CRKey Framework take the place of traditional software "Objects", when the goal is capturing user intent, or communicating between systems. Moreover, Conceptual Objects are described in rigorous semantics that Digital Membranes can then translate into system-specific expressions that can evoke desired computational behavior from locally-available systems.

Methods are provided to easily and definitively identify characteristics or actions of a Conceptual Object (e.g. a global concept) on multiple separate computer or information systems, and hence easily or automatically correlate related information resident on various computer systems through their translation to local expressions of the (global) Conceptual Object. The CRK Framework, for example, can in various implementations provide mechanisms for identifying objects that participate in digital interactions in a way that is independent of the associated local computer artifacts or architectures. In some implementations, a structure for specifying global concepts or objects is provided. In some implementations, digital interactions and relationships between objects or concepts can be represented as objects in themselves. A structure is described and provided to specify objects independent of any particular computer, network, or digital culture.

For purposes of this disclosure, the terms defined herein include, but are not necessarily limited to the descriptions provided herein. A "Digital Culture" in some implementations can be a domain of commonality, e.g. location, time, a specific industry, programming language, a particular network or computer system, etc., and its corresponding collection of objects, concepts, actors, events, etc., as understood by a collection of people or systems interacting digitally. For example, a group of high school students with an interest in 18th-century New England quilt embroidery would be a rather narrow digital culture, while a global network of websites, forums, and live chat rooms dedicated to the music of Michael Jackson would be a very broad digital culture. As an additional example, a company or specific groups within a company can comprise separate but overlapping digital cultures.

A "CRK Framework" in some implementations can be an environment for defining and implementing interoperability models (CRK Models, defined in further detail below) over collections of distributed applications, users, or systems. In some implementations, these applications, users, or systems communicate over a network (e.g. the Internet or a company intranet). In other implementations they are internal to a machine or cluster of machines. A CRK Framework in some implementations allows management of information within a Digital Culture or between digital cultures, and can include the ability to define static or dynamic, descriptive or executable objects or models that (1) describe concepts, actors, objects, actions, etc.; (2) contain interoperating roles, relationships, and functions of applications and systems within a digital culture or across digital cultures; (3) facilitate communication between distributed systems and applications; or (4) map globally-consistent descriptions to local environments and their executable capabilities, e.g., interfaces, objects, methods, etc.

In some implementations, a "CRKey Holder", an instance of a Conceptual Object, can be a specific actor, action, event, concept, etc. In some implementations, a "CRKey" can be a collection of metadata or other information sufficient to correctly identify a CRKey Holder. A CRKey will be uniquely associated to the specific instance or collection of instance of Conceptual Objects that the CRKey Holder is intended to represent. CRKeys will be uniquely defined within a Digital Culture, but may differ across Digital Cultures. In some implementations a canonical CRKey can exist that will be unique across all Digital Cultures, and can be translated uniquely to specific Digital Cultures, where relevant (e.g., in the example above, a CRKey for Michael Jackson is not relevant to the 18th Century New England quilt embroidery Digital Culture). Some examples of a CRKey may include schema, including other CRKeys.

In some implementations, a "CRK Format" or "CRK Formatter" can define the structure and content mapping of CRKeys. Some example CRK Formatters can be defined and referenced within a CRK Framework, providing uniformity of CRKey structures across various CRK Models. The CRK Formatter in some implementations can populate the structure of a CRKey with appropriate contextual data for a system or Digital Culture based on locally relevant computer artifacts. The CRK Formatter will also perform the reverse translation, i.e., the information from a CRKey will be reformatted into the locally relevant capabilities.

A "CRK Model" according to some implementations can define and implement system, application, and Digital Culture interoperability structures within a CRK framework. A CRK Model according to some implementations can enable the specifying of CRKeys for CRKey Holders, where CRKeys capture the characteristics of CRKey Holders that are required to identify them, as well as other data pertinent to the CRKey including related context, actions, actors, objects, etc.

The CRKey Model encapsulates a "universal vocabulary" for the digital culture. A CRKey Framework captures the relationships between this universal vocabulary and local expressions of that digital culture, i.e., local systems, networks, etc. In that regard the CRKey Framework represents a mapping of the n-dimensional space represented by all possible values of each concept in the universal vocabulary and any relevant expression, e.g., data or services, of the local information environment. From that perspective a CRKey is a point or hyperplane in the n-dimensional conceptual universe defined by the CRKey Model.

In some implementations this mapping is facilitated by relating the CRKey Model universal vocabulary to an executable collection of one or more expressions in a local vocabulary, "X-Types" that can, in turn, manage local information management behavior vocabularically.

In some implementations, CRKey Models enable cataloging of CRKeys by characteristics of CRKey holders, including contextual data related to the creation of the CRKeys, and interactions and relationships among CRKey Holders, as captured from interoperations within a CRK Framework. In some implementations interactions among CRKey Holders are also treated as Conceptual Objects, and thus, have their own CRKeys. In some implementations, CRKeys can be treated as CRKey Holders, and also be cataloged as CRKeys, (e.g. according to their characteristics and relationships). CRKeys can be cataloged for, e.g. deep analysis, forensics, and security purposes.

In some implementations, CRK Models enable making requests, causing events, and taking actions within a network or digital culture using CRKeys. Additionally, CRK Models can enable capturing context through CRK Catalogs to refine processes enabled through CRK Models. In some implementations, CRK Models facilitate interacting with applications and systems by translating CRKeys into local concepts, events, actions, etc. that are recognized, e.g., by a specific system or digital culture.

A "CRKey Catalog" according to some implementations can be a distributed repository of CRKeys and indexes, and in some implementations can include context-relevant metadata such as the originating CRK Model, references to local computer artifacts, content of the CRKeys, and other relevant data as determined by the system developer. In some implementations, the CRKey Catalogs can represent a rapid context acquisition service that allows information about any CRKey to be quickly accessed.

In some implementations the CRKey model definition itself is distributed. In those implementations when the context or content for a CRKey is new to a CRKey Framework, the CRKey Framework that created the CRKey is queried for the CRKey-relevant semantic description that will enable local mapping of that CRKey without programmer intervention.

In some implementations, a CRKey event is an event that takes place that can be captured as a CRKey. A CRKey event can be a computational event, e.g., a payment made in a bank system, but also a non-computational event, e.g., an earthquake whose occurrence is captured in a seismometer on a network. A CRKey event is, by its nature, globally unique: it doesn't make any difference how many seismometers capture the CRKey event of an earthquake, there is only one CRKey event, i.e., the earthquake.

In some implementations, a "Global Actor" can be a composite (i.e., cross-system, cross-network, cross-platform), logical CRKey holder that participates in a CRKey event. In some implementations, each Global Actor is unique across all systems participating in a Digital Culture, i.e., Global Actors, and the events in which they participate, are understood in terms of the actual occurrences, rather than, e.g., various consequent computer artifacts. In some implementations, a Global Actor can be an object (a thing), a relationship, a CRK action, or an object created as a result of a CRK action. For example, a particular CRK model may define "Person" as a CRK holder, and then map any well-identified person to a Global Actor with a unique CRKey.

This model represents an improvement over traditional methods which are built around local conceptions of actors. In traditional methods an incoming artifact is interpreted locally to see what effect it has on local systems. The CRKey Framework operates on exactly the opposite principle: how do local systems effect the state/understanding/actions of the Global Actor(s) uniquely specified by its CRKey.

In some implementations, a "Service Target" can be a Global Actor that will be the executor of a requested action through its local representation in a computer system. In some implementations, a Service Target can initiate a CRKey event. In some implementations, every Service Target has a CRKey.

A "Digital Interaction" according to some implementations can be any event that happens in a digital machine, computing device, or network, and may be captured as or relate to a CRKey Event. A digital interaction is a globally unique occurrence, but may be only one expression of a CRKey Event, e.g., no matter how many digital interactions that record an earthquake, there was only one earthquake. A digital interaction can result in a computer artifact (e.g. a log file), but the digital interaction is not the computer artifact itself. In some implementations a Digital Interaction is captured as a CRKey Event. In some implementations, a digital interaction can be defined in part by its associated time and location.

In some implementations, a "CRK Event" can be captured for any deliberate digital interaction that happens in an environment for which a CRK model has been defined within a CRK framework. In a typical implementation, a CRK event may generate CRKeys (which can then be captured, e.g. by a CRK model), and each CRKey typically includes an associated date, time, and location. In some implementations, CRKeys generated by a CRK Event can also include CRKeys of global actors and other model-defined objects, or other contextually unique data related to a digital interaction or CRK event.

In some implementations, a "Service Invocation" can be the triggering of a CRKey event. A service invocation can be a CRKey holder represented by a CRKey. In some implementations, CRKeys for service invocations can, e.g.: (1) explicitly define Service Targets; (2) implicitly define Service Targets based on the type of service, or (3) be defined less finitely so as to represent a more general query.

The systems and processes described herein can be implemented in a number of ways. Example implementations are provided below with reference to FIGS. 1-10.

FIG. 1 is a block diagram of several example systems responding to a request by a requesting system, according to some implementations of the present invention. In various implementations, a requesting system 102 may correspond, for example, to a particular information system, database, a local or distributed computing system, or even a digital culture or agent thereof. In some implementations, requests and responses described herein may correspond to a service invocation as described in further detail in various other passages herein.

According to some implementations, requesting system 102 may typically include a memory 104 and data store 106. Depending on the exact configuration and type of computing device, memory 104 can be volatile (such as RAM), non-volatile (such as ROM, flash memory, etc.) or some combination of the two. Memory 104 in various implementations may further include additional elements, for example an operating system, one or more program modules, program data, etc. Data store 106 in various implementations can typically refers to any type of information storage means. In some implementations, data store 106 may include a database, physical or logical hard drive, electronic log files, or any other of the numerous forms of storing data.

In various implementations, requesting system 102 generates a request 108. Request 108 may be generated by requesting system 102 creating and/or transmitting an object containing data related to a concept about which requesting system 102 seeks more data. For example, requesting system 102 may combine all information from data store 106 that may be related. For example, the combined information may relate to particular concepts, users, actions, events, things, or artifacts, etc. Request 108, then in some implementations may then be both an object embodying the related information and a global request for more related information or context. In other implementations, request 108 may simply be a request (e.g. for more information or context), leaving digital concept manager 110 to create an object embodying the request or otherwise process request 108 as described in further detail below. In some implementations, request 108 may embody or define a target instance, where the target instance represents a concept about which more information is to be found.

Request 108 may be processed by a digital concept manager 110. In some implementations, request 108 and/or an object embodying such a request may be transmitted or communicated directly to digital concept manager 110. In some implementations, other means of the digital concept manager 110 becoming aware of a request may be implemented alternatively or in combination with direct transmission. For example, requesting system 102 may notify digital concept manager of the existence of the request using a general or custom protocol. Such notification might include a location of request 108 or an object associated therewith. Alternatively, digital concept manager 110 may otherwise store or track information on where to find requests generated by requesting system 102 or other systems; thus digital concept manager 110 may be able to locate request information or context with only the simplest of notifications.

In various implementations, digital concept manager 110 may be a standalone or distribute computing system separate from any other systems in FIG. 1. In other implementations, digital concept manager 110 may be a component of a requesting or responding system, or digital concept manager may be distributed across various systems.

Digital concept manager 110 may generate one or more response requests 112(a)-(c) directed to one or more responding systems 114(a)-(c). In some implementations, digital concept manager 110 may include logic for locating one or more target responding systems 114(a)-(c). Criteria for locating target responding systems may, in some implementations, include subject matter of the request 108, including date and time ranges, geographical areas, digital cultures, or any other type of context information or data.

In some implementations, digital concept manager 110 may affirmatively communicate a request 108 with each known potential responding system 114 or with a subset of known potential responding systems, such as one or more selected target responding systems. In other implementations, digital concept manager 110 may generate an object including data of request 108 and make the object available to one or more responding systems 114 or other systems. Digital concept manager may affirmatively or passively communicate to responding systems 114 (or other systems) the existence of request 108 and any associated object, according to various implementations.

Each responding system 114 may, in various implementations, include a data store 116. Data store 116 typically refers to any type of information storage means. In some implementations, data store 116 may include a database, system log files, a physical or logical hard drive, or any other of numerous methods of storing data. In some implementations, a responding system 114 may determine whether the responding system includes or has access to any information relevant to a request 108 or 112. In some implementations, a responding system 114 may identify one or more local objects or entities containing information, context, or other data relevant to a request 108 or 112.

In some implementations, a responding system 114 may process a global request (e.g. from a digital concept manager 110) to generate a local action compatible with responding system 114. In other implementations, responding system 114 may generate its own local action or actions. In various implementations, responding system 114 may initiate or execute one or more remotely or locally generated a local actions in order to generate local action results.

Responding systems 114(a)-(c) of FIG. 1 may produce responses 118(a)-(c) in response to one or more of requests 108 or 112. Such responses may typically include local action results or other data or context information related to a request 108 or 112. Similarly to other requests and responses, response 118 may be a direct or passive communication of all or a part of any data or context of responding system 114 relevant to request 108 or 112. Response 118 in some implementations may include updating global or local objects with relevant information held by responding system 114. In some implementations, response 118 may include a message from responding system 114 that responding system 114 does not have any information in response to requests 108 or 112. In other implementations, responding system 114 might simply take no action, e.g. if responding system 114 does not have any data or context to contribute in response to requests 108 and 112.

In some implementations, digital concept manager 110 generates a global response 120. In some implementations, a digital concept manager 110 may explicitly expose an interface representing a digital membrane. In various implementations, global response 120 might be an object or other embodiment of combined data and context from all responding systems 114. In other implementations, global response 120 may be a notification that no additional information is available, or that a global object including data or context relevant to 108 has been updated to include data of responding systems 114. In other implementations, global response 120 may provide references that allow either the the digital concept manager 110 or the requesting system 102 to get the information as needed from its original source.

In various embodiments, digital concept manager 110 may translate or reformat request 108 so that the request can be understood by various potential responding systems, including responding systems 114(a)-(c). In some implementations, a response request 112 may include information associated with request 108 that has been translated or reformatted to be understood by the corresponding responding system 114. In some implementations, digital concept manager 110 may, in response to a request 108, generate an action to be performed by a responding system 114, requesting system 102, or by the digital concept manager itself.

In some implementations, digital concept manager 110 is not required as a separate logical or physical entity, and responding systems 114 and requesting system 102 may instead communicate or otherwise share information, context, etc. directly with each other. Likewise, the concepts of "requesting system" and "responding system" are not mutually exclusive and in some cases might apply simultaneously to the same system or systems. For example, in FIG. 1, both requesting system 102 and responding system 114 may contribute information, concepts, or context directly to each other or to a global object, which may reside, e.g., on any of the systems shown in FIG. 1, on a remote or cloud storage server, or on any other information system as one of ordinary skill in the art would understand, whether shown in FIG. 1 or not.

Figure 2:
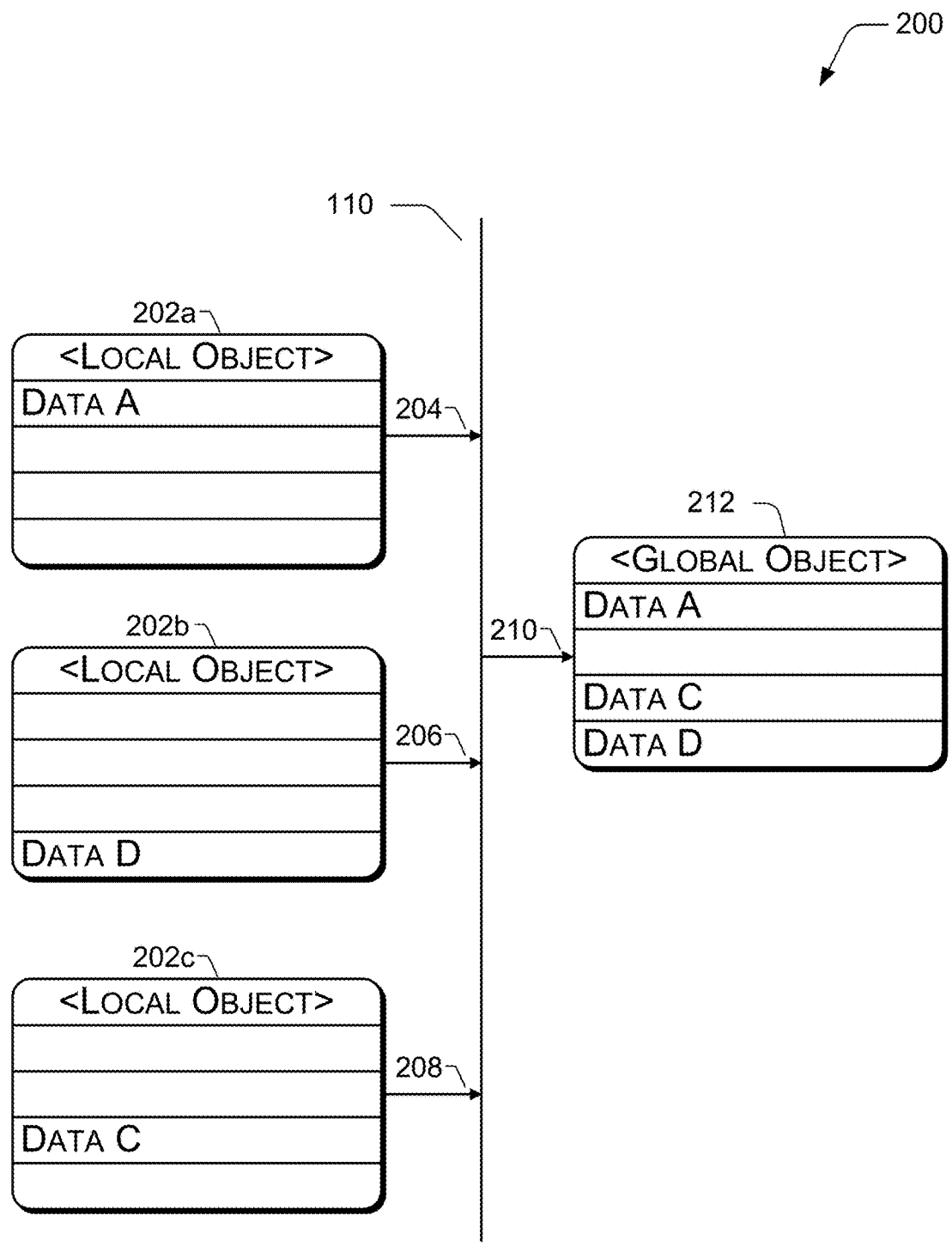
FIG. 2 is a block diagram showing a global object populated by data of several local objects.

FIG. 2 is a block diagram showing a global object populated by data of several local objects. In some implementations, this diagram may represent a very specific type of data and context sharing. For example, local objects 202(a)-(c) in some implementations may represent objects including information relevant to one or more of a request 108 or 112 as shown in FIG. 1 and discussed elsewhere herein. In some implementations, local objects 202(a)-(c) may reside in or otherwise be associated with one or more responding systems 114.

In the example of FIG. 2, each of local objects 202(a)-(c) includes a different piece of data—"Data A" in local object 202(a), "Data D" in local object 202(b), and "Data C" in local object 202(c). Local objects 202(a)-(c) communicate responses 204, 206, and 208 to digital concept manager 110, according to some implementations. Responses 204, 206, and 208 may contain "Data A," "Data D," and "Data C," respectively.

In some implementations, the specific data entries to be communicated may be chosen from all of the data and context in each local object using information of one or more of request 108 or requests 112. Digital concept manager 110 in some implementations may translate or otherwise modify responses 204, 206, and 208 in order to be understood by one or more requesting or responding systems.

Digital concept manager 110 may generate response 210 to communicate data of one or more of local objects 202(a)-(c) to global object 212. In some implementations, response 210 may be designed to populate global object 212 with data collected from at least the local objects 202(a)-202(c). In some embodiments, global object 212 may be populated with data of local objects 202(a)-(c) substantially directly, without a digital concept manager 110 or other intermediary. In some implementations the data in global object 212 is maintained by reference only so that it can be retrieved as needed from the relevant local object.

Figure 3:
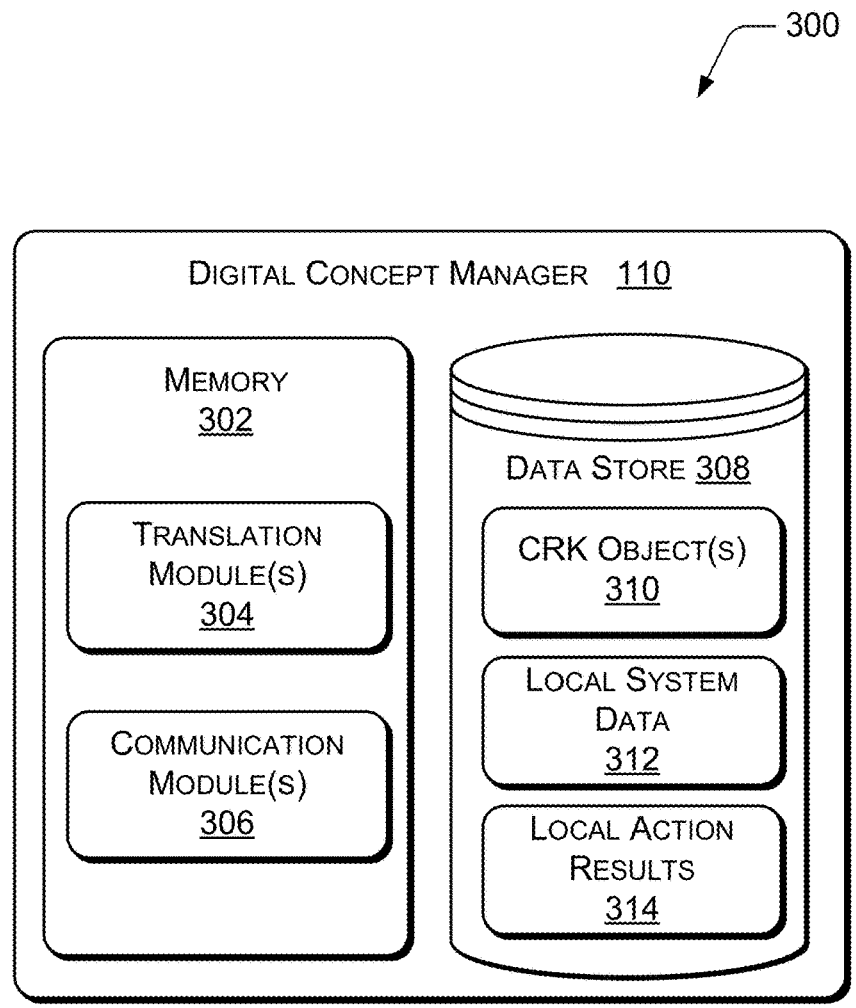
FIG. 3 is a block diagram of an example digital concept manager.

FIG. 3 is a block diagram of an example digital concept manager 110 according to various implementations of the present invention. Depending on the exact configuration and type of computing device, memory 302 can be volatile (such as RAM), non-volatile (such as ROM, flash memory, etc.) or some combination of the two. Memory 302 in various implementations may include additional elements, for example an operating system, one or more program modules, program data, etc.

Translation module 304 of memory 302 may be configured to translate data between various systems, for example, as described herein with reference to FIG. 1. Translation module 304 may, for example, reformat syntax, data structures, language, or other parameters for enhanced accuracy of request or to increase efficient use of computing and other resources. In some implementations the translation module relates global digital concepts to their local equivalents. In some implementations, translation module may generate local actions for a particular system, for example a requesting system 102 or responding system 114. In various implementations, generated local actions may be communicated to or executed on various systems or platform.

Communication module 306 of digital concept manager 110 is configured to manage communications between digital concept manager 110 and various other systems, for example requesting system 102 or a responding system 114 of FIG. 1. In some implementations, communications module 306 may receive a full request or object, notification of the creation of a request, notification of a request object, or another type of communication (e.g. request 108 of FIG. 1) from one or more requesting systems 102 of FIG. 1. Communication module 306 may communicate received requests, wholly or partially, in original or translated form to one or more responding systems 114 (e.g. requests 112 of FIG. 1). By similar mechanisms, communication module 306 in some implementations may receive responses (e.g. responses 118 of FIG. 1) from one or more responding systems 114 of FIG. 1. Communication module 306 may also communicate received responses, wholly or partially, in original or translated form to one or more requesting systems 102 of FIG. 1 (e.g. by response 120 of FIG. 1).

Referring again to FIG. 3, digital concept manager 110 may further include a data store 308. In some implementations, data store 308 includes one or more CRK objects 310. CRK objects 310 may include concepts, users, actions, events, things, artifacts, or other information. In some implementations, CRK objects 310 correspond to global concepts relevant across, for example, various computer or information systems or across various digital cultures. As described above, CRK objects 310 in some implementations represent objects related to a CRK framework (described in further detail herein with respect to FIGS. 4 and 5), where the CRK framework is designed to provide mechanisms for identifying objects that participate in digital interactions in a way that is independent of any associated digital culture, local computer artifacts, or specific digital architecture. Just as in traditional object-orientation, CRK Objects 310 can represent the type of object, i.e., the Class, and instances of the object. In some implementations CRK Objects 310 include references that allow the CRK object to use the Translation Module 304 to transparently represent themselves either as local or global objects and to interoperate with local system data 312.

In some embodiments, data store 308 may also include local system data 312. Local system data 312 may include information related to, for example, various digital cultures, computer architectures, or specific computing or information systems. For example, local system data 312 may include configuration information used to translate requests, actions, objects, concepts, or context between one or more requesting systems 102 of FIG. 1 and one or more responding systems 114 of FIG. 1, as further described herein.

Local system data 312 may also include local actions generated for various systems, digital cultures, or computing environments. In some implementations, these local actions may be related to partial or complete requests received by digital concept manager 110. In some embodiments, data store 308 may also include local action results 314, which may include information received or generated as a result of executing local actions, or in response to the generation or communication of local actions to various systems.

Figure 4:
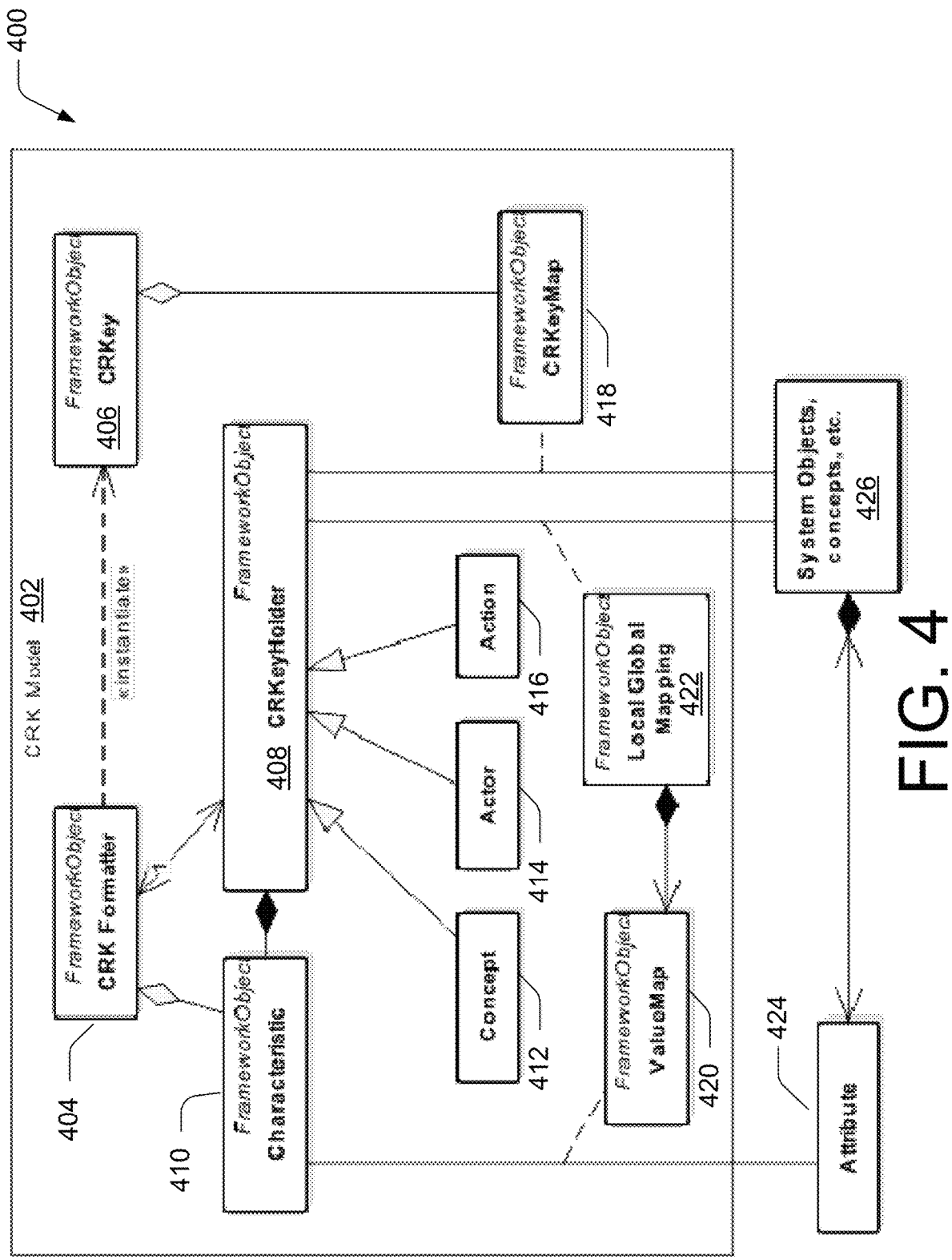
FIG. 4 is a Unified Modeling Language ("UML") diagram of an example CRKey model specification.

FIG. 4 is a Unified Modeling Language ("UML") diagram of an example CRKey model specification. FIG. 4 includes various standard or common UML relationship notations which will be understood by one of ordinary skill in the art. Relationships between components shown in FIG. 4 are presented herein solely as examples of particular implementations. This disclosure does not in any way limit such possible relationships to those specifically disclosed herein, and a person of ordinary skill will recognize the possibility of many alternative or complementary implementations.

In various implementations, a CRKey model may be used to implement actions such as the requests and responses described above with reference to FIGS. 1-3. For example, a digital concept manager 110 may implement various translations, communications, or creation or updating of objects using a CRKey model architecture.

System designers may describe concepts, objects, actions, etc. that define a digital culture using a CRKey model that allows the concepts, objects, or actions to be understood uniquely and globally. Each concept, object, action, actor, or other element may be specified and captured within CRKeys that are formatted in compliance with a CRK Framework. Details of specification may include global semantics, units of measure, or relationships. CRKey structural components according to some implementations may be expressed as collections of descriptions of base objects in the CRK Framework, including definitions of contextual elements in order to increase accuracy of identifications of global concepts, actors, service invocations, etc.

In some implementations, a CRK Model can also define characteristics and relationships required to be part of CRKeys in order to accurately map CRKeys to local equivalents, including implicit resolution through CRKey Catalogues. In some implementations, CRKeys need not be directly translatable to a particular context or system—instead, content of CRKeys may be analyzed and related to contextual data that may be accessed through CRKey Catalogs, and computer artifacts related to CRKeys through common characteristics.

In some implementations, a CRK framework is reflexive or self-referential in that it may use its own CRK model to describe the base types of CRK framework objects (e.g. global actors, objects, concepts, CRKey events, etc., and in particular, the CRK framework object "CRKey." In some implementations, a CRKey formatter may be designed to capture CRK model objects uniquely and globally as collections of CRK framework concepts, actors, actions, etc. A set of CRK models may define a digital culture modeled in the CRK framework. By making a CRK model reflexive, i.e., defining and implementing it using its own CRKey model, the definitions of concepts, users, systems, events, actors, actions, etc. can be understood contextually in addition to in relation to the information or properties of the concepts themselves.

A CRKey Model 402 defines a series of relationships among CRKey Framework objects that allow interpretation of, and creation of CRKeys 406, according to the digital culture in which the CRKey Model operates. In some implementations the CRKey 406 uses the CRKeyMap 418 to interpret the CRKey as actions, data, etc., in local capabilities 426 that are executed on behalf of the CRKeyHolders 408. The CRKeyHolders 408 participating in the requests are described or implied by the CRKey 406. This CRKeyMap 418 uses data from a CRKey 406 to identify the relationship between CRKeyHolders 408 and local actions 426 either explicitly, or implicitly by looking at ValueMap 420 relationships between Attributes 424 of local behavior 426 and Characteristics 410 of CRKeyHolder 408, respectively. In some implementations the CRKeyMap itself can be determined dynamically based on local actions 426 or on aggregated CRKey resolutions involving the CRKeyHolders and their associated CRKeys. For example in some implementations a series of CRKeys that ultimately become resolved to a particular action 426 itself can become part of the CRKeyMap 418, i.e., substantial evidence of a mapping can in some implementations end up being a mapping. In some implementations the collection of CRKeys and their resolution (CRKey Catalog) becomes part of the CRKey Map to implement this dynamic behavior. Since the CRKeyMap can evolve over time in some implementations two CRKeys that differ only in a Time characteristic can be result in different actions or different data as interpreted by a time-based dynamic CRKeyMap.

CRK model 402 of FIG. 4 discloses example mapping of elements of a CRK model. Generally, when implementing a CRK model, each network or other digital element managed by the CRK model can have each of its elements including its data, services, events, and actions mapped to CRK model equivalents. Using the services of the CRK framework, the CRK model may capture as CRKeys any requests, instances, or activities of various CRKey holders, including global actors, service targets, service invocations, or global digital interactions. In some implementations, CRKeys may be translated into local system or network elements or local equivalents. In some implementations, CRKey catalogs (not shown) may contain CRKeys, components, relationships, and locations of relevant context in other locations and systems.

A CRK model 402 according to some implementations may include CRK formatter 404. A CRK format in general, and CRK formatter 404 specifically, may define the structure and content mapping of CRKeys. This structure is typically defined and referenced within the CRK framework, providing uniformity of CRKey structures in all CRK models. CRK formatter 404 according to some implementations may place appropriate contextual data into the structure of CRKeys.

In some implementations, CRK Formatter 404 may instantiate one or more CRKeys 406. CRKey 406 may include or embody a collection of metadata and data that is sufficient to correctly identify a CRKey holder within a digital culture, system, or other context. In some implementations, a CRKey 406 may include schema, which may in turn include other CRKeys. In some implementations, one or more CRKey holders 408 are associated with a CRK formatter 404. Typically, each CRKey holder is associated with a single CRK formatter 404, while a CRK formatter may by associated with numerous CRKey holders. A typical CRKey holder 408 according to some implementations represents a specific actor, action, event, concept, etc., for example within a digital culture. A CRKey Holder may have an associated CRKey within any CRK Model.

A CRKey holder 408 may define or be associated with various characteristic objects 410, which may define types of characteristics and values useful for describing, conceptualizing and composing or identifying CRKeys. A characteristic object 408 may also be associated with CRK formatter 404, which understands how to use the characteristics to assemble a CRKEey. In some implementations, the characteristic objects 410 are unique components of the corresponding CRK holder 408.

In various implementations, one or more each of concept(s) 412, actor(s) 414, and action(s) 416 may be associated with or inherit from each CRK holder 408, according to various implementations. As described elsewhere herein, various concepts, actors, actions, digital cultures, etc. may be identified and partially or wholly defined by their contexts or global conceptual and contextual properties. For example, an actor 414 according to some implementations may represent a global concept of an actor. In some implementations, an actor 414 may include a composite, logical CRKey holder that participates in a CRKey event. Each global actor is typically unique in that it represents, at least in part, the contextual reality of something that exists, is happening or has happened, rather than computer artifacts that may be consequent to actual happenings.

A global actor or actor 414 according to various embodiments may be an object (a thing), or may be, for example, a CRKey action or object that is created as a result of a CRKey action. As a specific example, a particular CRK model may define "person" as a CRKey holder. This "person" may be a global actor with a unique CRKey, even though "person" might be represented wholly or partially in multiple objects across multiple systems or contexts over which the CRK model operates.

Each CRKey 406 may be associated with one or more CRKey maps 418. In some implementations, each CRKey map 418 may define the relationship between a particular CRKey 406 and the systems, concepts, etc. that represent its CRKeyHolder's local capabilities and expressions as expressed in the Systems Objects, concepts, etc.

In some implementations, a CRK holder 408 may be associated with one or more local-global mapping objects 422. In some implementations, a local-global mapping object may include information and context for translating or otherwise associating global concepts or contexts with local objects or data. Local-global mapping objects 422 may, for example, be used by a digital concept manager such as digital concept manager 110 of FIG. 1 for processing and communicating requests and responses between various systems or contexts. In various implementations, a local-global mapping object may define one or more value maps 420 for mapping and holding values related to local-global mapping information in general, and specifically to the local-global mapping object 422 that corresponds to each valuemap 420.

In a typical implementation, system objects, concepts, contexts, etc. 426 may be associated with each CRKey holder 408. Each element 426 may define or include one or more attributes 424, which may in turn be associated with one or more characteristic objects 410.

Figure 5:
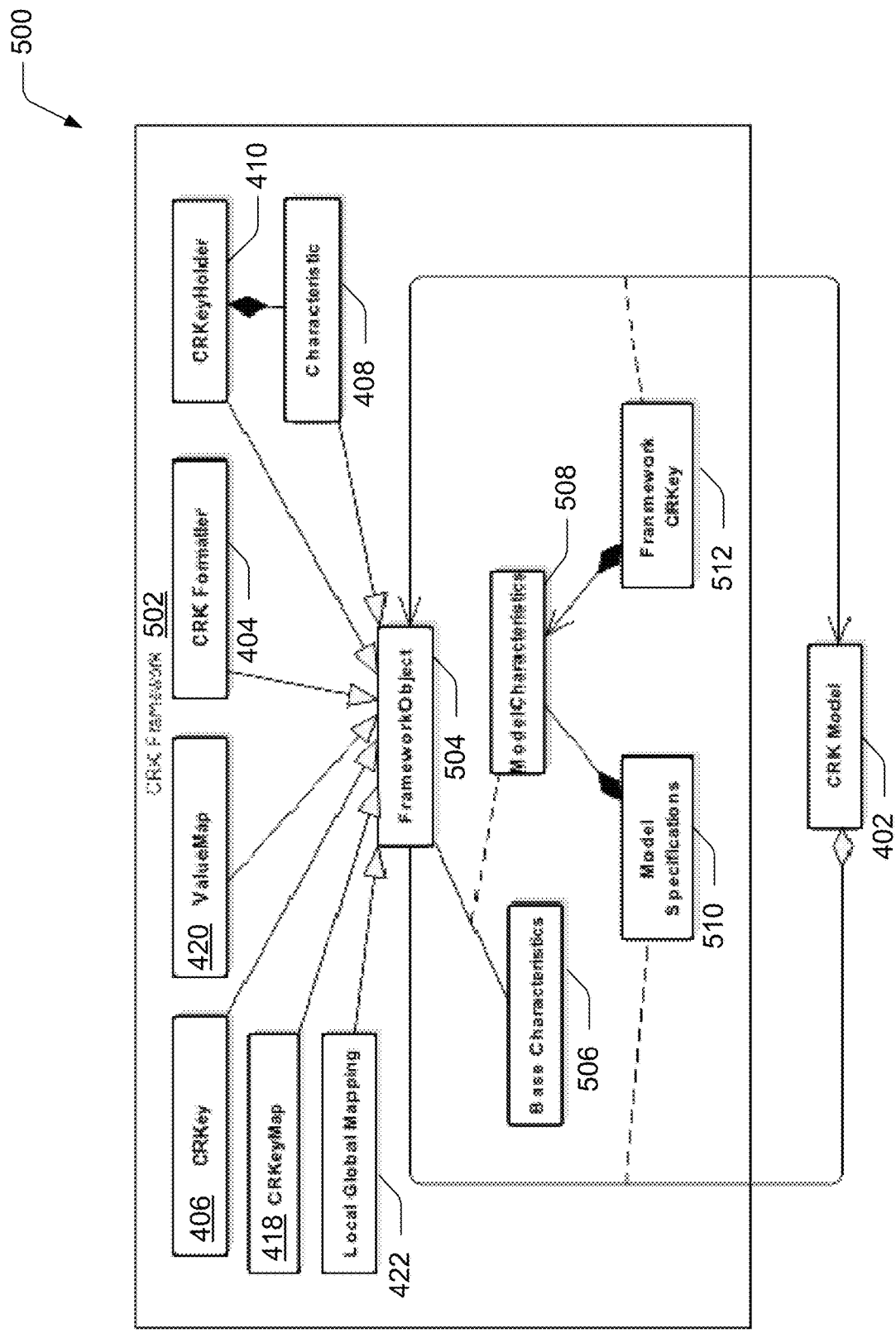
FIG. 5 is a UML diagram of an example CRK Framework specification.

FIG. 5 is a UML diagram of an example CRK Framework specification. FIG. 5 includes various standard or common UML relationship notations which will be understood by one of ordinary skill in the art. Relationships between components shown in FIG. 5 are presented herein solely as examples of particular implementations. This disclosure does not in any way limit such possible relationships to those specifically disclosed herein, and a person of ordinary skill will recognize the possibility of many alternative or complementary implementations.

CRK framework 502 of FIG. 5 defines an example architecture for a typical CRK framework, the various functions of which are described in detail elsewhere herein. In the example CRK framework 502, each of CRK formatter 404, CRKey 406, characteristic 408, CRKey holder 410, CRKey map 418, value map 420, and local-global mapping object 422 inherit from framework object 504, where framework object 504 defines a system structural object type for implementing CRK framework 502. Each of CRK framework 502, each of CRK formatter 404, CRKey 406, characteristic 408, CRKey holder 410, CRKey map 418, value map 420, and local-global mapping object 422 may retain its relationships, structure, and function as described above with reference to FIG. 4, in addition to or instead of their respective relationships and functions as shown in FIG. 5.

In various implementations, example framework objects 504 are collected by and associated with a CRK model 402. A typical framework object 504 may be associated with one or more base characteristics objects 506 in the CRK Framework, which may define the contextual elements intended to ensure accuracy of identification of global actors, concepts, actions, etc. or service invocations. A framework object 504 or base characteristics object 506 may be further associated with model characteristics which, in the example framework, define various types of information, contexts, or characteristics that might be useful to defining various objects.

CRKey models manage collections of instances of general Framework Objects (in the class sense) whose characteristics are defined in Model Specifications 510, with some of those Framework objects having their own Framework CRKey (reflexively, as described above) as defined by Framework CRKeys 512. This framework CRKey object 512 may then be cross-referenced, e.g., by various other objects, systems, contexts, or framework elements, to allow relating concepts from one CRKModel to equivalent concepts in other CRKey Models.

FIG. 6 is a chart showing an example XType specification showing the XType SignatureLogs. In the example of FIG. 6, an XType may be conceptualized as a specific implementation or embodiment of a CRKey Holder (in the class sense). In this implementation a digital processing system uses a collection of XTypes to implement the digital membrane, i.e., the XType is an implementation construct that implements CRKey Models as described above. In the example of FIG. 6, the sample XType is designed to contain standardized information related to accesses of a particular web site or set of web sites.

The example XType of FIG. 6 is named "SignatureLogs," and described as "web site access log X-Type." A source of data to populate the XType SignatureLogs is names as "ApacheLog" and described as "Reference to ApacheLog Table." Apache® in this context may refer to any of various instances of systems running the popular web server software published by the Apache Software Foundation.

Various elements of XType Signature logs are defined in table 600 of FIG. 6. Elements are named components of an XType that can manage the relationship between the X-Type and the underlying set of systems. In this implementation Elements are not just data holders, but software that can manage the relationships described in the figures above, i.e., the ValueMaps, Characteristics, etc. Columns of definition illustrate some of these relationships, and include element name (column "Element"), i.e., the way that characteristic is known in a digital culture; the way that type of data should be treated by that element (e.g., numeric, date/time, or content in column "Data Type"); type of element (e.g., persistent, vector, composite, or reference in column "Element Type") that dictates the kinds of transformations that are necessary for the Element to behave as it is intended; location or name column "Column") in an underlying system or database, in this case the ApacheLog source, in which the data is found; the vector (column "Vector") that references a relationship to another XType where data useful to this XType is found; reference element definition (column "Reference Element"), a particular Element of the other XType that is useful to this XType; formatter reference (column "Formatter") that can describe special coding that is required for this Element; and data description (column "Description").

In various implementations, a persistent element may refer to data provided as part of the structure of the Source, while vector, composite, and reference elements may refer to types of data used to implement and cross-reference XTypes and other objects. For example, element "SignatureLogs" of Xtype SignatureLogs has a description "X-Type 'Self-VectorElement'" because it is a self-referential object vector, where a vector can be thought of as defining a relationship between two objects or entities.

In the example of FIG. 6, element "Protocol" is a string data type and "composite element" referencing a SignatureLogs vector and reference element "Signature." Protocol is a composite element because it contains information from multiple locations as defined by the format referred to by the SignatureLog vector within a SignatureLog Xtype) but also a The "Protocol" element further calls the "Protocol Formatter" reference element and has the description "Protocol as derived from Signature."

In the example of FIG. 6, element "ProtocolType" is a string data type and "reference element" referencing a vector to XType "ProtocolTypes" (described below with reference to FIG. 7) and reference element "ProtocolType". The description of element "ProtocolType" is "[t]he protocol type derived from Protocol," referring to the protocol element defined by example XType SignatureLogs.

The remaining elements are persistent elements derived directly from source data. IPAddress is of type "String," column "IP_Address" (from the source), and description "Web site accessors address." IpPort is of type "Numeric," column "IP_Port" (from the source), and description "Web site accessor's port number." AccessTime is of type "DateTime," column "Timestamp" (from the source), and description "Time of web site access." Signature is of type "String," column "Request" (from the source), and description "Time of Web site access." The element Result is of type "String," column "Result" (from the source), and description "Result of request."

Elements include IPAddress, described as data type "string"

Further detailed descriptions of XTypes and similar implementations appear in related patent and patent applications incorporated herein by reference above, namely U.S. Pat. Nos. 7,647,337, 7,783,766, 8,290,988, 8,706,774, and U.S. Patent Application Pub. No. 2011/0035477 related to Global Information Architecture, Global Information Network Architecture, Network Clustering Technology, Vector-Relational Data Modeling, WorldSpace architecture, Xtype and other objects, and other concepts.

FIG. 7 is a chart showing an example XType specification of type ProtocolType. Chart 700 of FIG. 7 is of the same structure as chart 600 of FIG. 6 as described in detail above. FIG. 7 shows an example specification of another XType, ProtocolType, which is referenced by XType SignatureLogs as described in FIG. 6. The example XType of FIG. 7 is called "ProtocolType" with description "Protocol type X-Type." The source of the example ProtocolType XType of FIG. 7 is "ProtocolType" with description "Reference to ProtocolType Table."

Element Protocol of the example XType of FIG. 7 is defined as a string data type, persistent element referencing source column "Protocol" and described as a "Protocol Signature." Element "ProtocolType" of the example XType of FIG. 7 is defined as a string data type, persistent element referencing source column "Protocol Type" and described as a "Protocol Type description." The example element "ProtocolTypes" of the example XType of FIG. 7 is defined as data type "Content," a vector element with self-reference to Vector "ProtocolTypes" and described as "X-Type 'Self-VectorElement'."

FIG. 8 is a chart showing example vector specifications related to example XTypes SignatureLogs (as described herein with reference to FIG. 6) and ProtocolTypes (as described herein with reference to FIG. 7). As described in detail in the incorporated patent and patent application references, as well as elsewhere in this document, a vector is a type of definition or context that may describe how one object can be reached by another object. In a typical implementation, objects are linked by describing what object or data source is to be reached, what is the technique to be used for reaching them, and what Elements (which in this case act as attribute or data values) represent the Characteristics that can be used for implementing the technique.

Vector "SignatureLogs" of the example of FIG. 8 is described as the "Primary SignatureLogs Vector," having target XType SignatureLogs, i.e. the Vector can be used for accessing SignatureLogs, and vector type "Proximity", i.e., the technique that should be used for accessing SignatureLogs should be based on the Proximity technique. Vector references of vector SignatureLogs include: numeric field descriptor 10 referencing element "IpAddress" of XType SignatureLogs; numeric field descriptor 20 referencing element "IpPort" of XType SignatureLogs; and numeric field descriptor 30 referencing element "AccessTime" of XType SignatureLogs. In this case, Proximity is understood to be shared values of IpAddress, IpPort, and AccessType.

Vector "ProtocolTypes" of the example of FIG. 8 is described as the "Primary ProtocolTypes Vector," having target XType ProtocolTypes and vector type "Proximity." Vector ProtocolTypes references to field 10 of XType ProtocolTypes, which defines element "Protocol" of XType ProtocolTypes.

Figure 9:
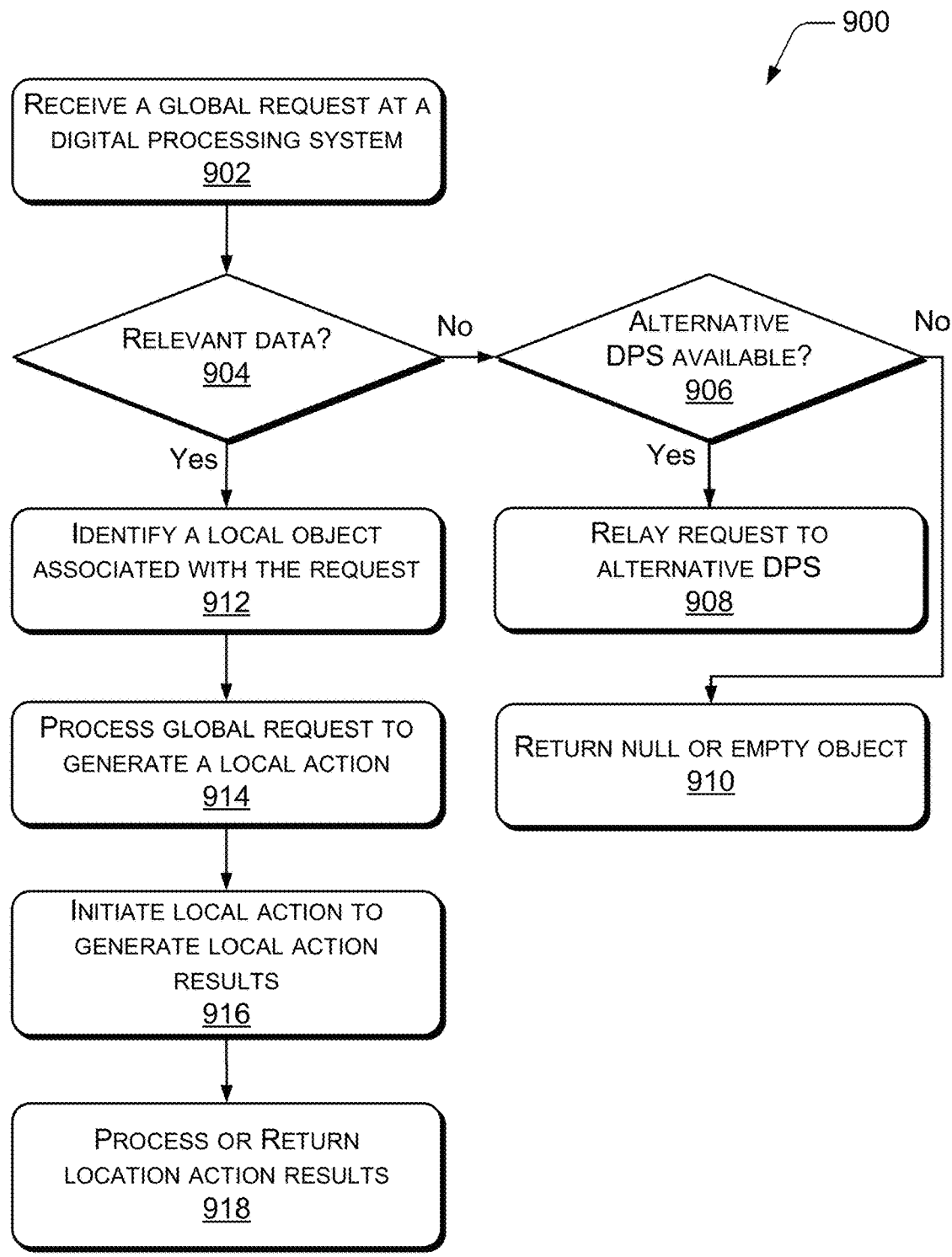
FIG. 9 is a flow diagram of an example process for a receiving system to handle a concept-based global data or context request.

FIG. 9 is a flow diagram of an example process for a receiving system to handle a concept-based global data or context request. In some implementations, FIG. 9 may represent an example service invocation request. At step 902, process 900 includes receiving a global request at a digital processing system. For example, the global request may in some implementations be a request 108 or 112 as described above with respect to FIG. 1, and the digital processing system may be responding system 114. In other implementations, the digital processing system of step 902 may be a digital concept manager 110.

At step 904 of process 900, the digital processing system determines whether data is present that is relevant to the global request. If no relevant data is present, the digital processing system may return null or an empty object to a requesting entity at step 910. In other implementations, digital processing system may take no action at all in response to determining no relevant data. In some implementations, step 904 may not be performed at all, and flow would instead pass directly to step 912. For example, if the digital processing system is a digital concept manager 110, the determination of the presence of data relevant to the global request may be irrelevant, or digital concept manager 110 may simply be configured to, e.g., generate a global object associated with data of the global request or otherwise proceed without attempting to determine its proximity to relevant data.

At step 904 the digital processing system may only function as a relay where the request is sent to other digital processing systems. At step 906, the digital processing system determines if there are other digital processing systems that have relevant information based on its knowledge of the digital content that known digital processing systems have. If appropriate, the digital processing system will send the request to those digital processing systems at step 908.

At step 912 of process 900, the digital processing system identifies a local object associated with the global request, for example, the digital processing system is a responding system 114, a local data or other object may be identified by the digital processing system. In some implementations, for example when the digital processing system is a digital concept manager, step 912 may instead include identifying, by the digital concept manager, potential responding systems known to the digital concept manager that are most likely to contain information relevant to the global request. In some implementations this process is implemented by the XType of FIG. 6 that is configured to represent the global concept that can moderate the relationships between the global concept and the underlying systems.

At step 914 of process 900, the digital processing system processes a global request to generate a local action. For example, if the digital processing system is a responding system 114, step 914 may include generating a search for information related to the global request using syntax local to the digital processing system and content or context provided by the global request itself. In some implementations, the global request to generate a local action may be generated by a digital concept manager. In some implementations, local actions may be generated by the digital processing system without specific instructions from outside the digital processing system.

At step 916 of process 900, the local action is initiated or executed to generate local action results, which may include, for example, data, context, or objects relevant to the global request. At step 918, the generated local action results are processed or returned. For example, local action results in some implementations may be transmitted to a requesting system or a digital concept manager, or a notification or location information about local action results may be sent to a requesting system or digital concept manager. In some implementations, step 918 may include a responding system or digital concept manager updating a global or other data object directly with information, context, vectors, or objects related to the global request. In some implementations the XType of FIG. 6 performs this translation.

Figure 10:
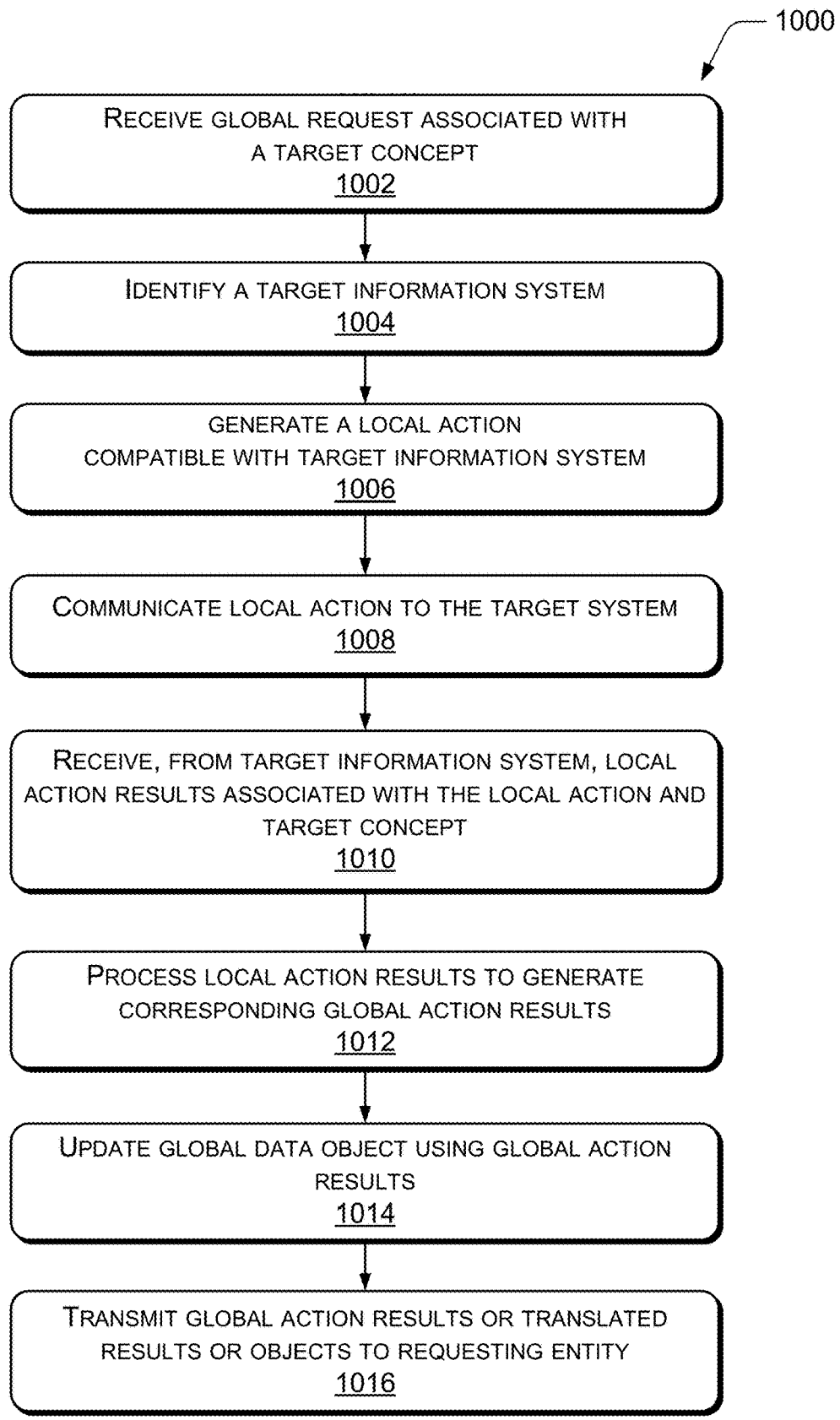
FIG. 10 is a flow diagram of an example process for a digital concept manager to handle a concept-based global data or context request.

FIG. 10 is a flow diagram of an example process for a digital concept manager to handle a concept-based global data or context request. In some implementations, FIG. 10 may describe an example service invocation model or service invocation request. In some implementations, a digital concept manager may include or embody a digital membrane.

At step 1002 of process 1000, a digital concept manager receives a global request associated with a target concept. A target concept may include, for example, a global concept of an actor, action, event, context, object, etc, or simply raw data or information in a form local to a requesting system or entity.

At step 1004 of process 1000, the digital concept manager identifies at least one target information system. In some implementations, the target information system may be a responding system 114 as described in detail above with reference to FIG. 1.

Referring again to FIG. 10, at step 1006 of process 1000, the digital concept manager generates a local action compatible with the one or more target information systems. At step 1008 of process 1000, the digital concept manager communicates the generated local action to the target system. In some implementations, several or many local actions may be generated and communicated simultaneously or in series.

At step 1010 of process 1000, the digital concept manager receives from the target information system, local action results associated with the local action and target concept. For example, if the local action included a search query of the target information system, at step 1010 the digital concept manager may receive raw or formatted search query results or an object including the same. In some implementations, step 1010 may include the digital concept manager receiving a notification of the presence of a local action result object or a notification that the target information system has updated a global object associated with the target concept.

At step 1012 of process 1000, the digital concept manager processes the received local action results to generate corresponding global action results. For example, the digital concept manager may translate results that are local to the target information system into a global data or information format, or into a format local to a requesting entity.

At step 1014 of process 1000, the digital concept manager updates a global data object using the global action results. For example, the digital concept manager may create or update a global object associated with the target concept. In some implementations, for example where the target information system has directly updated a global object associated with the target concept, step 1014 may be performed simultaneously with step 1010, or step 1014 may not be necessary at all.

At step 1016 of process 1000, the digital concept manager transmits global action results or translated results or objects to a requesting entity. For example, the digital concept manager may directly communicate results or one or more objects embodying global request results to a requesting entity, or the digital concept manager may notify the requesting entity of the existence or location of results of one or more objects embodying results of the global request.

Although the techniques have been described in language specific to structural features and/or methodological acts, it is to be understood that the appended claims are not necessarily limited to the features or acts described. Rather, the features and acts are described as example implementations of such techniques.

Conditional language such as, among others, "can," "could," "might" or "may," unless specifically stated otherwise, are understood within the context to present that certain implementations include, while other implementations do not include, certain features, elements and/or steps. Thus, such conditional language is not generally intended to imply that certain features, elements and/or steps are in any way required for one or more implementations or that one or more implementations necessarily include logic for deciding, with or without user input or prompting, whether certain features, elements and/or steps are included or are to be performed in any particular implementation.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow charts described herein and/or depicted in the attached figures should be understood as potentially representing modules, segments, or portions of code that include one or more executable instructions for implementing specific logical functions or elements in the routine. Alternate implementations are included within the scope of the implementations described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described implementations, the elements of which are to be understood as being among other acceptable examples. All such modifications and variations are intended to be included herein within the scope of this disclosure and protected by the following claims.

What is claimed is:

1. A computer system comprising:
   a first processing system having a first local object specified with first object attributes consistent with first interface conventions of a first context of the first processing system; and
   a second processing system communicatively coupled to the first processing system, the second processing system having a second local object specified with second object attributes consistent with second interface conventions of a second context of the second processing system, different from the first interface conventions, the second interface conventions to enable performance of a local action with an instance of the second local object within the second context, wherein the second processing system cannot perform the local action with the instance of the first local object in the second context;

wherein the first processing system is to map a data value of one of the first object attributes to an instance of a global conceptual object to pass to the second processing system, the global conceptual object to define a concept in a global domain mappable to the one of the first object attributes and to one of the second object attributes, wherein the global conceptual object does not define a global domain mappable to at least one other of the first object attributes within the first context;

wherein the second processing system is to interpret the instance of the global conceptual object in accordance with the second interface conventions to enable performance of the local operation on an instance of a local object as mapped from the instance of the global conceptual object with the data value of the one of the first object attributes.

2. The computer system of claim 1, wherein the first processing system includes an instance of a global object manager to map the data value of the first local object to the instance of the global conceptual object in the global domain.

3. The computer system of claim 1, wherein an instance of the first local object comprises an executable model, executable by interpretation of the executable model within a first local domain of the first processing system to enable local capabilities of the first processing system.

4. The computer system of claim 1, wherein an instance of the second local object comprises an executable model, executable by interpretation of the executable model within a second local domain of the second processing system to enable local capabilities of the second processing system.

5. The computer system of claim 1, wherein the second processing system includes an instance of a global object manager to receive the instance of the global conceptual object from the first processing system in the global domain.

6. The computer system of claim 1, wherein the one of the first object attributes and the one of the second object attributes comprise an informational attribute to provide data of the respective first and second processing systems related to the global domain of the instance of the global conceptual object.

7. The computer system of claim 1, wherein the one of the first object attributes and the one of the second object attributes comprise a computational attribute to provide a computational functionality of the respective first and second processing systems related to the global domain of the instance of the global conceptual object.

8. The computer system of claim 1, wherein the instance of the global conceptual object comprises an executable model, executable by interpretation of the executable model within the global domain.

9. The computer system of claim 8, further comprising the second processing system to generate an instance of a global result object to pass to the first processing system in response to performance of the local operation, wherein the instance of the global result object comprises an executable model, executable by interpretation of the executable model within the global domain.

10. The computer system of claim 9, wherein the second processing system includes an instance of a global object manager to map a result value of the local operation to the instance of the global result object.

11. A method comprising:
generating an instance of a global conceptual object to represent a concept in a global domain of a computer system in an execution layer generic to a first processing system having a first local object specified with first object attributes consistent with first interface conventions of a first context of the first processing system, and generic to a second processing system having a second local object specified with second object attributes consistent with second interface conventions of a second context of the second processing system;

wherein the second interface conventions of the second processing system enable the second processing system is to perform a local action with an instance of the second local object within the second context, wherein the second processing system cannot perform the local action with the instance of the first local object in the second context, wherein the global conceptual object defines a concept in a global domain mappable to one of the first object attributes and to one of the second object attributes, wherein the global conceptual object does not define a global domain mappable to at least one other of the first object attributes within the first context;

mapping a data value of the one of the first object attributes to an instance of the global conceptual object;

passing the instance of the global conceptual object from the first processing system to the second processing system for data related to a domain of the global conceptual object; and interpreting the instance of the global conceptual object in the second processing system in accordance with the second interface conventions to enable the second processing system to perform the local operation on a local object as mapped from the instance of the global conceptual object with the data value of the one of the first object attributes.

12. The method of claim 11, wherein the first processing system includes an instance of a global object manager to map the data value of the first local object to the instance of the global conceptual object in the global domain.

13. The method of claim 11, wherein an instance of the first local object comprises an executable model, executable by interpretation of the executable model within a first local domain of the first processing system to enable local capabilities of the first processing system.

14. The method of claim 11, wherein an instance of the second local object comprises an executable model, executable by interpretation of the executable model within a second local domain of the second processing system to enable local capabilities of the second processing system.

15. The method of claim 11, wherein the one the first object attributes and the one of the second object attributes comprise:
an informational attribute to provide data of the respective first and second processing systems related to the global domain of the instance of the global conceptual object.

16. The method of claim 11, wherein the one of the first object attributes and the one of the second object attributes comprise a computational attribute to provide a computational functionality of the respective first and second processing systems related to the global domain of the instance of the global conceptual object.

17. The method of claim 11, wherein the second processing system includes an instance of a global object manager to receive the instance of the global conceptual object from the first processing system in the global domain.

18. The method of claim 11, wherein the instance of the global conceptual object comprises an executable model, executable by interpretation of the executable model within the global domain.

19. The method of claim 18, further comprising the second processing system to generate an instance of a global result object to pass to the first processing system in response to performance of the local operation, wherein the instance of the global result object comprises an executable model, executable by interpretation of the executable model within the global domain.

20. The method of claim 19, wherein the second processing system includes an instance of a global object manager to map a result value of the local operation to the instance of the global result object.

* * * * *